United States Patent [19]

Murck

[11] Patent Number: 4,564,227

[45] Date of Patent: Jan. 14, 1986

[54] FLANGED DUCT JOINT UTILIZING SNAP-IN CORNER PIECES

[76] Inventor: James W. Murck, Rte. 2, Maple Lake, Minn. 55358

[21] Appl. No.: 574,044

[22] Filed: Jan. 26, 1984

[51] Int. Cl.⁴ .............................................. F16L 23/00
[52] U.S. Cl. .................................... 285/364; 285/406; 285/424
[58] Field of Search ............... 285/363, 364, 405, 406, 285/424

[56] References Cited

U.S. PATENT DOCUMENTS 3,630,549 12/1971 Grimm ........................... 285/424 X

FOREIGN PATENT DOCUMENTS 2501611 7/1976 Fed. Rep. of Germany ...... 285/424

Primary Examiner—Richard J. Scanlan, Jr.
Attorney, Agent, or Firm—Peterson, Wicks, Nemer & Kamrath

[57] ABSTRACT

Four corner pieces are used to connect the ends of two rectangular duct sections together. Each duct wall has a groove at its end and also a flange, the flange in each instance having a resilient rim or lip. The corner pieces comprise two offset legs, the legs each having a web residing in planes parallel to each other and having a connecting portion residing in a plane intermediate said two planes. In this way, one leg is engageable with a portion of a flange on one of the duct sections and the other leg is engageable with a portion of a flange on the other duct section. Due to the resiliency of the flanges, the legs, which have angled flanges thereon, can be snapped into place to retain the two duct sections in a connected end-to-end relationship.

16 Claims, 6 Drawing Figures

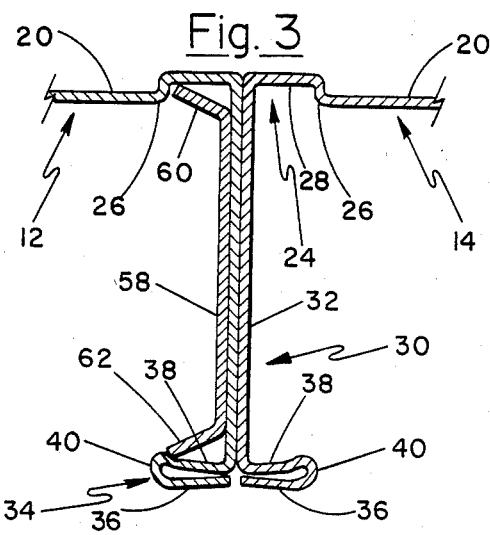
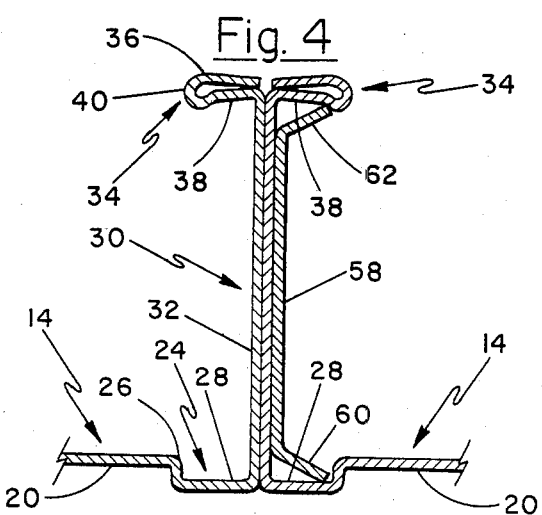
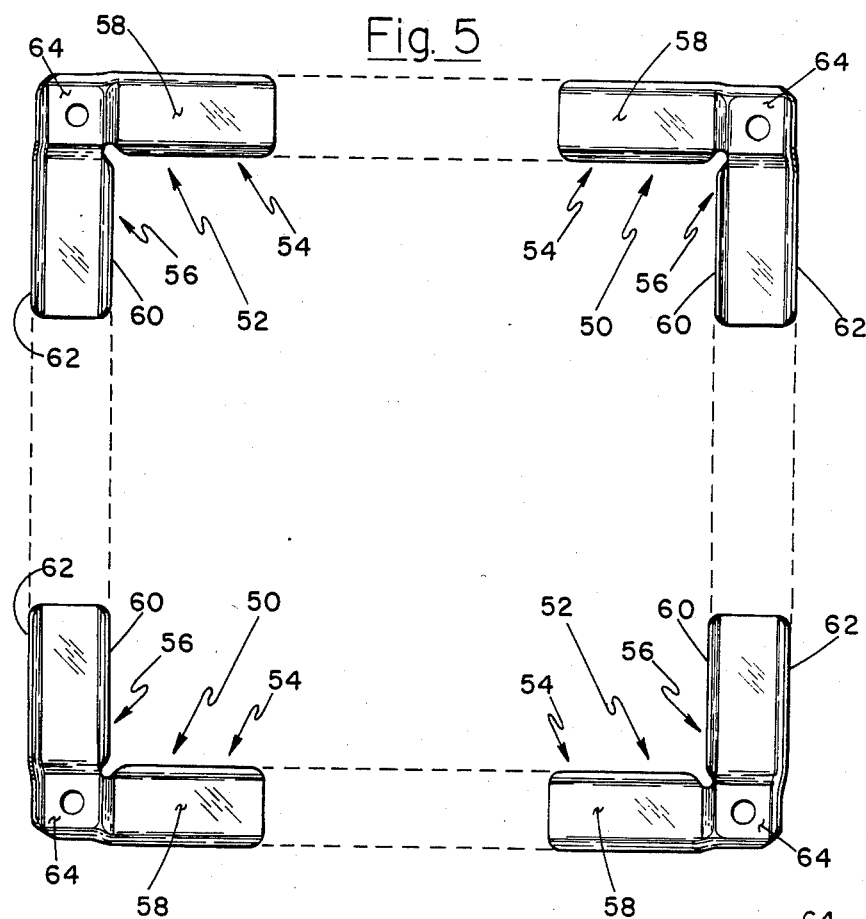
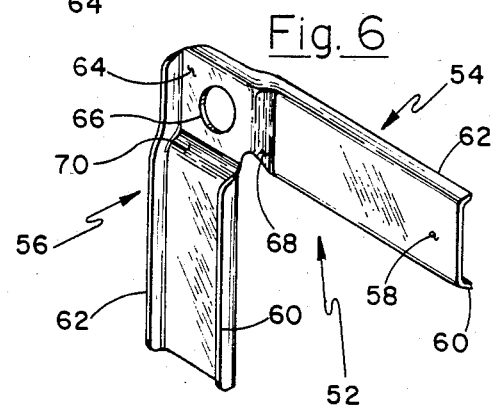

FLANGED DUCT JOINT UTILIZING SNAP-IN CORNER PIECES

BACKGROUND OF THE INVENTION

1. Field of the Invention

This invention relates generally to sheet metal ducts, and pertains more particularly to a means for connecting the ends of two duct sections together.

2. Description of the Prior Art

Various ways have been devised for joining duct ends together. Frequently, elaborate, complex and costly flange configurations have been employed. Additionally, various corner piece constructions have been utilized, usually requiring a fastener, such as a bolt, at each corner.

A number of widely differing joint assemblies have been patented. While it is difficult to single out a typical patent, several examples of patented connectors are: U.S. Pat. No. 3,754,782 issued on Aug. 28, 1973 to Ernest P. DeLord for "CORNER DEVICE FOR DUCT JOINTS," U.S. Pat. No. 4,218,079 issued on Aug. 19, 1980 to Peter J. Arnoldt for "FLANGE TYPE DUCT JOINT ASSEMBLY," and U.S. Pat. No. 4,288,115 issued on Sept. 8, 1981 to Michael T. Sullivan for "DUCT JOINTING SYSTEM."

SUMMARY OF THE INVENTION

A general object of my invention is to provide a way for connecting the ends of sheet metal duct sections together in a vastly simplified manner. More specifically, an aim of the invention is to provide a corner piece that can be readily snapped into a retaining relationship with the flanges at the ends of the duct sections to be connected together.

Another object is to provide a duct joint requiring only one corner piece at each corner. In this regard, prior art arrangements have required two corner pieces at each corner. Additionally, the arrangements with which I am acquainted have required a bolt at each corner, and inasmuch as there are four corners, four bolts have been needed for each joint. Hence, when following the teachings of my invention, four corner pieces are used instead of eight for each joint, and the need for any bolts is completely eliminated.

A further object is to appreciably reduce the time required to install sheet metal ducts. In this regard, only one corner piece is needed for each corner rather than two; this appreciably reduces the amount of labor. Also, inasmuch as no fasteners are required, the amount of labor is further reduced.

Yet another object of the invention is to provide a joint that will be sufficiently strong and reliable that the duct sections will not inadvertently become detached. Although sheet metal ducts normally are permanently installed, there being usually no need to disassemble the duct sections, nonetheless, my invention enables the sections to be taken apart when circumstances so dictate.

Still another object of the invention is to provide corner pieces that minimize any twisting of the duct sections relative to each other. More specifically, an aim of the invention is to provide what might be appropriately termed left and right corner pieces that function in concert to obviate the torsional forces that would otherwise tend to produce undesirable twisting of the connected duct sections relative to each other.

Briefly, my invention envisages a duct joint that requires only four corner pieces, one at each corner, so that material and labor costs are substantially reduced. The corner piece is formed with right angled legs that are offset with respect to each other so that one leg can be snapped into engagement with a flange on the end of one duct section and the other leg snapped into engagement with a flange on the next duct section to be connected.

BRIEF DESCRIPTION OF THE DRAWINGS

FIG. 3 is a sectional detail taken in the direction of line 3—3 of FIG. 1;

FIG. 4 is a sectional detail taken in the direction of line 4—4 of FIG. 1;

FIG. 5 is an elevational view of the four corner pieces utilized in making the joint connection in FIG. 1, the duct sections having been removed in order to better illustrate the lefthand and righthand configurations of the corner piece, and FIG. 6 is a perspective view of a lefthand corner piece in contradistinction to FIG. 2 which depicts a righthand corner piece.

DESCRIPTION OF THE PREFERRED EMBODIMENT

Figure 1:
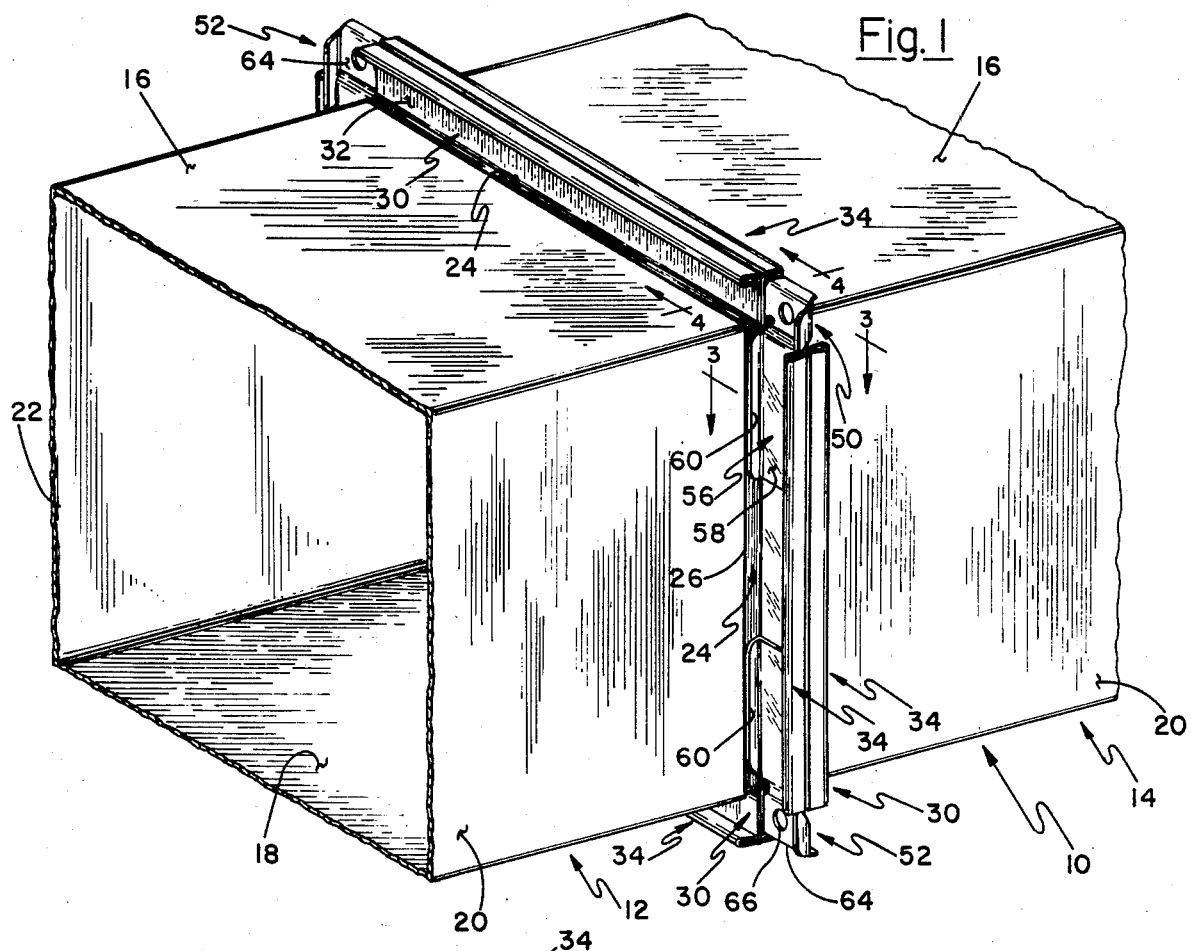
FIG. 1 is a perspective view of a duct joint in accordance with my invention.

FIG. 1 fragmentarily pictures a rectangular sheet metal duct which has been denoted generally by the reference numeral 10. While the duct 10 in practice will include any number of duct sections, two duct sections 12 and 14 have been shown in FIG. 1; actually, only the end portions of the duct sections 12 and 14 have been illustrated. It will be appreciated that the duct 10 is fabricated from galvanized sheet metal, usually having a 20–26 gauge thickness, and that the sections 12, 14 can have any suitable length, usually five feet.

Largely for identification between views, it can be stated that each duct section 12, 14 has a top wall 16, a bottom wall 18 and side walls 20, 22. These walls 16, 18, 20 and 22 provide a rectangular cross section as is clearly evident from FIG. 1.

As perhaps best understood from FIGS. 3 and 4, the ends of the duct sections 12, 14 are formed with peripheral grooves 24, each groove 24 extending across the particular wall 16, 18, 20 or 22 with which it is associated. In this way, a shoulder 26 and relatively narrow base 28 are provided.

At this time, attention is directed to a flange indicated generally by the reference numeral 30, there being one flange for each wall 16, 18, 20 and 22. Hence, there are a total of eight flanges 30, four for the duct section 12 and four for the duct section 14.

Describing the flanges 30 in greater detail, it will be observed that each flange 30 includes a strip 32 extending perpendicularly to the particular wall 16, 18, 20 and 22 with which it is associated. It will be recognized that the projecting strip 32 in each instance is integral with the base 28 which in turn is integral with its particular wall 16, 18, 20 or 22.

Figure 2:
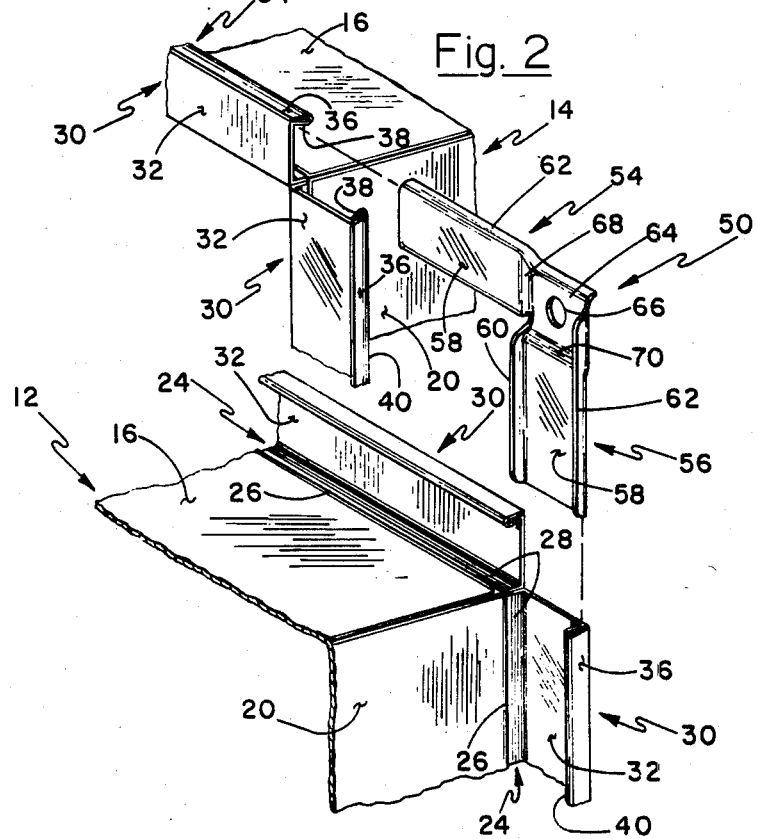
FIG. 2 is an enlarged exploded perspective view illustrating to better advantage the connection at the upper right in FIG. 1, the view showing quite clearly one of two righthand corner pieces.

Integral with each strip 32 is what will be termed a folded rim or lip 34, each rim or lip 34 including wall portions 36 and 38 as well as a bight portion 40 forming a free edge capable of being flexed in a manner presently to be made clear. Whereas the strip 32 projects perpendicularly from the narrow base 28, and also from the particular wall 16, 18, 20 and 22, the folded rim or lip 34 is not truly perpendicular relative to the plane of the strip 32. Close inspection of FIG. 2 will so indicate; from FIG. 2, it can be perceived that the rims or lips 34 there appearing slant or angle inwardly toward the walls 16 and 20. It has already been mentioned that the wall thickness of the duct sections 12 and 14 should preferably be on the order of 20-26 gauge. Not only does this facilitate the shearing and rolling of the metal, but affords a sufficient degree of resiliency that is made use of when practicing my invention.

Playing an important role with respect to my invention are two similar types of corner pieces designated by the numerals 50 and 52. The corner pieces 50, 52 are of heavier metal stock, although they can be molded from an appropriate plastic material, than the sheet metal for the duct sections 12, 14, the corner pieces being preferably fabricated from 14 gauge material. Actually, the corner piece 50 can be considered to be a righthand corner piece, whereas the corner piece 52 can be said to be a lefthand corner piece.

In FIG. 5, the four corner pieces are shown, there being two righthand corner pieces 50 and two lefthand corner pieces 52. One righthand corner piece 50 appears in FIG. 2, and one lefthand corner piece 52 appears in FIG. 6. Owing to the basic similarity of the two types of corner pieces 50 and 52, it will facilitate the ensuing description to employ the same reference numerals for corresponding parts or portions of each of the corner pieces 50 and 52.

Referring to the corner pieces 50 and 52 in detail, each corner piece 50 and 52 is comprised of channel-shaped legs 54 and 56. These legs 54 and 56, while extending at right angles to each other, are offset from each other. In this regard, it will be noted that each leg 54, 56 includes a flat web 58. More specifically, the web 58 for the leg 54 resides in one plane, and the web 58 for the other leg 56 resides in a parallel plane, one plane being offset relative to the other plane. Each leg 54, 56 further includes angled flanges 60 and 62. While the angulation given to the flanges 60, 62 relative to the web 58 is susceptible to some choice, in practice an obtuse angle on the order of 120° has been found satisfactory; this angulation is best seen in FIGS. 3 and 4.

Each corner piece 50, 52 further includes a generally square base or leg-connecting portion 64, the leg-connecting portion 64 having a hole 66 that is available for other uses when desired. It can be pointed out at this stage that the leg-connecting portion 64 resides in a plane intermediate the planes of the webs 58 of each leg 54, 56. Hence, as far as the construction of the corner pieces 50, 52 is concerned, three parallel planes are involved, the web 58 of the leg 54 being in one plane, the web 58 of the leg 56 being in a second plane, and the portion 64 being in a third plane, all of the planes being parallel to each other. While the portion 64 has been referred to as performing a leg-connecting function, it should be recognized that there are angled ramp portions 68 and 70 that directly connect the portion 64 to the webs 58 belonging to the legs 54 and 56. The portions 64, 68 and 70, however, collectively constitute what can be called a leg-connecting means.

One of the niceties of my invention is that each corner piece 50, 52 can be snapped in place. Use is made of the resiliency of the folded rim or lips 34 in doing this. The assembly procedure is extremely simple and straightforward. All that the installer need do is to insert the flange 60 of one of the corner pieces 50, 52 into a groove 24 so that the free edge of the inserted flange 60 is in juxtaposition with the shoulder 26. In doing this, the corner piece 50 or 52 is held at an angle. With the free edge of the flange 60 abutting the shoulder 26, all that the installer need do is to rock the corner piece 50, 52 into the plane of the selected flange 30, more particularly into the plane of the strip 32. This is where the resiliency of the folded rim or lip 34 comes into play, for it flexes to allow the other leg 62 of the particular leg 54, 56 to be snapped into engagement with the particular flange 30. Pliers or a vise clamp can be used to effect the above-mentioned engagement.

Virtually at the same time, the other leg, whichever leg 54, 56 has not had its flange 60 inserted into a groove 24 can then be so inserted and the leg pressed into place, the resiliency of the particular folded rim or lip 34 enabling this to be accomplished by reason of the flange 62 camming against the lip to flex it into a more perpendicular relation with its web 58.

From the drawings, particularly FIG. 5, it will be observed that the legs 54 all extend horizontally and the legs 56 all vertically. Thus, the webs 58 of the legs 54 all reside in a first vertical plane and the web 58 of the legs 56 all reside in a second vertical plane, the two planes being parallel but spaced. The portions 64, however, all reside in a third vertical plane which is intermediate the first and second planes. This relation can also be at least partially understood from FIGS. 1, 2, 3 and 4.

Whereas four righthand corner pieces 50 could be utilized or four lefthand corner pieces 52 employed, it can now be understood that the use of differing corner pieces 50 and 52 eliminates any tendency for the two duct sections 12 and 14 (and whatever other sections make up the completed duct 10) to twist relative to each other.

Should there be an occasion to disassemble the duct sections 12 and 14, it is only necessary to pry out the legs 54, 56, a screwdriver or pinch bar being suitable for this task. Normally, though, once a complete duct 10 has been assembled, being comprised of any number of duct sections 12 and 14, the duct remains connected. It is just that the disconnection can be readily accomplished if need be, especially inasmuch as no crimping is required when using my invention.

It should be recognized that when connecting the two sections 12 and 14 together, one would usually employ a gasket. The gasket simply would confront the flanges 30 of each section 12, 14. Also, as is frequently done, clips can be placed over the central portions of the flanges 30.

It should be noted that no fasteners, such as bolts, are needed when using the corner pieces 50, 52. This is a distinct advantage inasmuch as only four corner pieces 50, 52 are required to complete each joint. In this regard, just one corner piece 50 or 52 is employed at each corner, whereas prior art arrangements have normally required two at each corner, thereby totaling eight for each joint or connection. Furthermore, although the holes 66 (such as for relatively long reinforcing studs when needed) are provided, no bolts are used in actually effecting the connection of the duct sections 12, 14 when utilizing the teachings of my invention.

I claim:

1. A corner piece for joining two rectangular sheet metal duct sections together comprising a single first leg and a single second leg, said legs extending at right angles to each other and said first leg being offset from said second leg so that said first leg engages a flange on one of said two duct sections and said second leg engages a flange on the other of said two duct sections, and means extending only between the adjacent ends of said legs for maintaining said legs in their offset and angled relation.

2. The combination of claim 1 in which said legs reside in generally parallel first and second planes to provide said offset relation and said means for maintaining said legs in their said offset and angled relation includes at least one angled ramp portion.

3. A corner piece for joining two rectangular sheet metal duct sections together comprising a first leg residing in a first plane and a second leg residing in a second plate parallel to and offset from said first plane, said legs extending at right angles to each other so that said first leg engages a flange on one of said two duct sections and said second leg engages a flange on the other of said two duct sections, and means connecting said legs in their offset and angled relation including a generally flat portion residing in a third plane situated intermediate said first and second planes.

4. The combination of claim 3 in which said connecting means includes first and second angled ramp portions, said first angled ramp portion connecting said generally flat portion to said first leg and said second angled ramp portion connecting said generally flat portion to said second leg.

5. The combination of claim 3 in which each of said legs includes oppositely directed angled flanges.

6. The combination of claim 3 in which said first leg includes a web residing in said first plane and flanges projecting at obtuse angles from said web in a direction away from said first and second planes, and in which said second leg includes a web residing in said second plane and flanges projecting from the web of said second leg at obtuse angles in a direction away from said second and first planes.

7. In combination, a first duct section having an integral flange at one end thereof with one side thereof facing in the direction said first duct extends, a second duct section having an integral flange at one end thereof with one side thereof facing in the direction said second duct extends, and a corner piece including a single first leg engagable with said one side of the flange on said first duct section and a single second leg engagable with said one side of the flange on said second duct section, and means connecting said legs to each other to maintain said legs at substantially right angles with respect to each other and to maintain said legs in said first and second planes corresponding generally to the planes in which said flanges reside.

8. The combination of claim 7 in which each flange includes a resilient rim and each leg has an angled flange, the angled flange on said first leg being engageable with the rim on said first duct section and the angled flange on said second leg section being engageable with the rim on said second duct section.

9. The combination of claim 8 in which each of said duct sections includes a shoulder, each of said legs having a second angled flange, the second angled flange of said first leg being engageable with the shoulder of the first duct section and the second angled flange of said second leg being engageable with the shoulder of said second duct section.

10. In combination, a pair of duct sections, each having a top wall, a bottom wall and side walls, a generally perpendicular flange on each of said walls including a resilient rim forming a free edge spaced outwardly from the wall with which it is associated, four corner pieces having offset legs extending at right angles to each other so that one leg of each corner piece is engageable with a portion of one of the rims on one of said duct sections and the other leg of each corner piece is engageable with a portion of one of the rims on the other of said duct sections.

11. The combination of claim 10 in which each leg includes a web, the webs of said legs residing in parallel planes.

12. The combination of claim 11 including a pair of angled flanges on each of said webs, the flanges on the web of one leg angling in opposite directions from the flanges on the web of the other leg.

13. In combination, a pair of duct sections, each having a top wall, a bottom wall and side walls, each of said walls having a groove therein, a flange on each of said walls including a resilient rim spaced outwardly from the wall with which it is associated, four corner pieces having offset legs extending at right angles to each other so that one leg of each corner piece is engagable with a portion of one of the rims on one of said duct sections and the other leg of each corner piece is engagable with a portion of one of the rims on the other of said duct sections, each leg including a web, the webs of said legs residing in parallel planes, and a pair of angled flanges on each of said webs, the flanges on the web of one leg angling in opposite directions from the flanges on the web of the other leg.

14. The combination of claim 13 in which one leg of each of said corner pieces extends horizontally and the other leg of each corner piece extends vertically, the webs of said horizontal legs residing in a first vertical plane and the webs of said other legs residing in a second plane parallel to said one plane.

15. The combination of claim 14 in which each corner piece includes means connecting its legs at right angles to each other and having a portion residing in a third vertical plane intermediate said first and third vertical planes.

16. The combination of claim 15 in which said leg-connecting means includes angled ramp portions connecting said third plane portion to said webs.

* * * * *